United States Patent [19]

Wilson et al.

[11] Patent Number: 4,631,165
[45] Date of Patent: Dec. 23, 1986

[54] BOILING WATER REACTOR CONTROL ROD

[75] Inventors: John F. Wilson; Pratap K. Doshi, both of Murrysville, Pa.

[73] Assignee: Westinghouse Electric Corp., Pittsburgh, Pa.

[21] Appl. No.: 637,183

[22] Filed: Aug. 3, 1984

[51] Int. Cl.$^4$ .............................................. G21C 7/10
[52] U.S. Cl. ...................... 376/333; 376/327
[58] Field of Search ............................. 376/327, 333

[56] References Cited

U.S. PATENT DOCUMENTS

| 2,861,035 | 11/1958 | Zinn et al. | 376/327 |
| 2,990,360 | 6/1961 | Porembka . | |
| 3,103,478 | 9/1963 | Kooistra . | |
| 3,230,147 | 1/1966 | Hitchcock . | |
| 3,234,104 | 2/1966 | Gale et al. | 376/327 |
| 3,255,086 | 6/1966 | Hitchcock . | |
| 3,407,117 | 10/1968 | Lichtenberger | 376/327 |
| 3,448,008 | 6/1969 | Hellman | 376/327 |
| 3,485,717 | 12/1969 | Eich . | |
| 4,127,762 | 10/1979 | Anthony et al. . | |
| 4,285,769 | 8/1981 | Specker et al. . | |
| 4,400,347 | 8/1983 | Fredin et al. | 376/333 |
| 4,451,428 | 5/1984 | Nishimura et al. . | |

FOREIGN PATENT DOCUMENTS

| 2445370 | 4/1976 | Fed. Rep. of Germany | 376/327 |
| 0037396 | 3/1976 | Japan | 376/327 |
| 0017189 | 2/1977 | Japan | 376/333 |
| 0019893 | 2/1977 | Japan | 376/333 |
| 0015985 | 2/1977 | Japan | 376/327 |
| 0085295 | 7/1978 | Japan | 376/333 |
| 0022632 | 7/1978 | Japan | 376/327 |

Primary Examiner—Harvey E. Behrend

[57] ABSTRACT

A boiling water nuclear power reactor includes an improved control rod associated with each of its clusters of fuel assemblies. The control rod has an elongated central stem defining a longitudinally extending internal central gas plenum and a plurality of blades orthogonally arranged in pairs to provide a cruciform configuration in which the blades connect to and extend radially outward from the central stem. Each blade incorporates a series of internal cavities arranged in columns and rows across the length and width of the blade, and a neutron absorbing pellet is disposed in each cavity. The cavities communicate with the central plenum so that any gases generated by irradiation of the pellets can expand into the plenum. The cavities and pellets are arranged to form a longer, constant worth section in a body portion of each blade and a shorter, reduced worth section in an end tip portion of each blade. The end tip portion leads insertion of the blade body within the space between adjacent fuel assemblies when the control rod is moved into the fuel assemblies to control the reactive power thereof.

7 Claims, 9 Drawing Figures

BOILING WATER REACTOR CONTROL ROD

BACKGROUND OF THE INVENTION

1. Field of the Invention

The present invention relates generally to control rods for a nuclear reactor and, more particularly, is concerned with a control rod having an improved construction and improved absorber material arrangement for respectively reducing tensile stress in the control rod and providing a reduced worth control rod tip exposed to each fuel rod of the fuel assemblies associated with the control rod.

2. Description of the Prior Art

It is common practice in nuclear reactors of the boiling water reactor type (BWR) to control the power output and power distribution in the reactor core with control rods insertable from the bottom of the reactor into and from the fuel assemblies in the reactor core. In the BWR, the fuel assemblies each contain a plurality of fuel rods. Each fuel rod provides the nuclear fuel for the reactor in the form of a stack of sintered pellets arranged end-to-end in an elongated cladding tube sealed at its opposite ends. The fuel assemblies are typically grouped in clusters of four with one control rod associated with each four assemblies. In one known design, such as shown for example in U.S. Pat. No. 4,285,769, the control rod has a cruciform cross-sectional shape and a four blade construction. When the control rod is inserted within the fuel assemblies, its blades are positioned in the spaces between the adjacent fuel assemblies. Each such cluster of four fuel assemblies surrounding a control rod is commonly referred to as a fuel cell of the reactor core.

In a BWR control rod having the cruciform cross-sectional configuration, boron carbide powder is commonly used as the neutron absorber material. It is vibratory compacted into small diameter stainless steel tubes which are held in a cruciform array by a stainless steel sheath of each of the control rod blades. In operation, the control rods are moved vertically downward by a hydraulic drive mechanism in incremental steps, such as six inches in length, to increase reactor power.

Control rods of this composition have two undesirable characteristics: (1) stainless steel stress corrosion cracking (SCC); and (2) pellet clad interaction (PCI). On the one hand, SCC results from relatively high tensile stresses in the stainless steel tubes containing the boron carbide powder. The tensile stresses are produced by several conditions: (1) consolidation of the vibratory compacted boron carbide powder, (2) internal pressure due to irradiation-induced helium generation; and (3) irradiation-induced swelling of the powder. SCC frequently results in split tubes with loss of boron carbide powder from the control rods. On the other hand, PCI is caused by a step increase in power in the fuel pellets within the cladding tubes adjacent to the tip of the control rod. PCI often leads to fuel rod clad perforations. A power increase of as much as 150 percent at the tip of the corner fuel rods adjacent to the control rod can be expected. This sudden increase in pellet power results in an increase in pellet temperature which causes it to expand radially outward into contact with the fuel rod cladding. The resultant cladding strain, along with chemical attack on the inside of the cladding, results in PCI.

One method of alleviating the PCI problem is to restrict control rod movement during high reactor power. Power is reduced by flow control before the control rods can be moved. A second method is to line the inside of the fuel rod with a material which will tend to prevent PCI. Both of these methods are closely in terms of reactor availability and fuel fabrication costs.

The solution proposed to alleviate PCI in the control rods of the above-mentioned patent is to produce a "grey tip" on the end of the control rods by providing the vertical tubes containing the boron carbide powder with shorter lengths at the end of the blades or by using short sections of hafnium at the blade tips. Thus, the grey tip is composed of full length absorber material at the center of the cruciform-shaped control rod with gradually shorter lengths progressing outward on the blades. From a macroscope standpoint, this can be considered as a "grey tip," but from an individual fuel rod standpoint, it is not. When the control rod is moved, the pellets in the corner fuel rods of the fuel assemblies see the same large step change in reactivity (i.e. neutron flux) as in a standard control rod without any grey tip since the absorber tubes at the center of the control rod are the same diameter and are filled to the top with absorber material. Since the corner fuel rods are the limiting rods from a PCI standpoint, the design of the above-cited patent does not improve the PCI problem. Additionally, this design does not compensate for the SCC problem in the control rods. Tensile stress caused by helium gas pressure buildup due to the absorption of neutrons by the boron atoms and caused by swelling of the boron due to the same interaction can occur in this design. Boron carbide will leak out of the control rod and thereby limit the life of the rods.

Consequently, a need exists for an improved control rod design which will alleviate both the SCC problem and the PCI problem. Such design can be incorporated into control rods used for replacement of the original rods which have a limited lifetime.

SUMMARY OF THE INVENTION

The present invention provides an improved control rod for a boiling water reactor designed to satisfy the aforementioned needs. The design of the present invention alleviates the SCC problem by greatly reducing the tensile stress in the control rod and alleviates the PCI problem by a unique arrangement of absorber material at the tip of the control rod blades. SCC due to tensile stresses in the stainless steel of the control rod due to helium gas pressure is alleviated by providing a large gas plenum at the center of the control rod which reduces the internal pressure in the control rod. Also, pelletized boron carbide, instead of powder, is placed in control rod cavities which are designed oversized to accommodate boron swelling due to irradiation. PCI is alleviated by reducing the magnitude of the step change in pellet power due to control rod motion. The arrangement of the absorber material at the tip of the control rod produces a gradual change in the neutron flux at each fuel rod near the tip of the control rod rather than the abrupt change produced in the fuel rods by the aforementioned design. Then, when the control rod is moved, each of the fuel pellets will see a much reduced step change in power. This will reduce the change in temperature in the pellets which, in turn, reduces the magnitude of cladding strain associated with the movement of the control rods. This reduction in strain greatly reduces the possibility of PCI.

Accordingly, the present invention is directed to an improved control rod used in a nuclear power reactor. The reactor includes a plurality of fuel assemblies grouped together in clusters, with each assembly containing a plurality of elongated fuel rods disposed in side-by-side relationship. Also, the reactor includes a number of improved control rods, each control rod is associated with one of the clusters of fuel assemblies in general alignment with the center thereof. A drive mechanism is operable to move the control rod into and from its respective cluster of fuel assemblies for controlling the reactive power of the fuel rods therein. The improved control rod is comprised of: (a) an elongated stem; (b) a plurality of blades connected to and extending radially outward from the stem, each blade including an elongated body portion and terminating in an end tip portion which leads insertion of the blade body portion within the space between adjacent ones of the fuel assemblies when the control rod is moved into the fuel assembly cluster; and (c) neutron absorbing means in each of the blades being arranged to form a longer, constant worth section in the body portion of the blade which maintains a generally uniform level of reactive power at adjacent fuel rods in the fuel assemblies as the body portions of the blades move past the fuel rods and a shorter, reduced worth section in the end tip portion of the blade which produces a gradual change in the reactive power at each fuel rod near the tip portion of the control rod blades as the end tip portions of the blades move past the fuel rods.

More particularly, each of the blades incorporates a series of internal cavities arranged in columns and rows across the length and width of the blade. The neutron absorbing means is in the form of a plurality of pellets of neutron absorbing material, each disposed within one of the cavities and being undersized in relation to the size of its cavity. The elongated stem of the control rod defines a longitudinally extending internal central gas plenum within the control rod. Each of the blade cavities is connected in communication with the central plenum so that any gases generated by irradiation of the pellets can expand into the gas plenum. Also, the pellets in the reduced worth section of the blade in the end tip portion can take a variety of configurations for producing the desired gradient. In one embodiment, the reduced worth section is an array of triangular-shaped pellets. In another, the array of pellets are widely spaced at the tip portion of the blade with a gradual reduction in spacing to form the desired gradient. If a step-wise change is desired instead of a gradient, then smaller width pellets can be placed in the tip portion of the blade than in the constant worth section. Other variations are possible.

DETAILED DESCRIPTION OF THE PREFERRED EMBODIMENT

In the following description, it is to be understood that such terms as "forward," "left," "upper," etc., are words of convenience and are not to be construed as limiting terms.

In General

Figure 1:
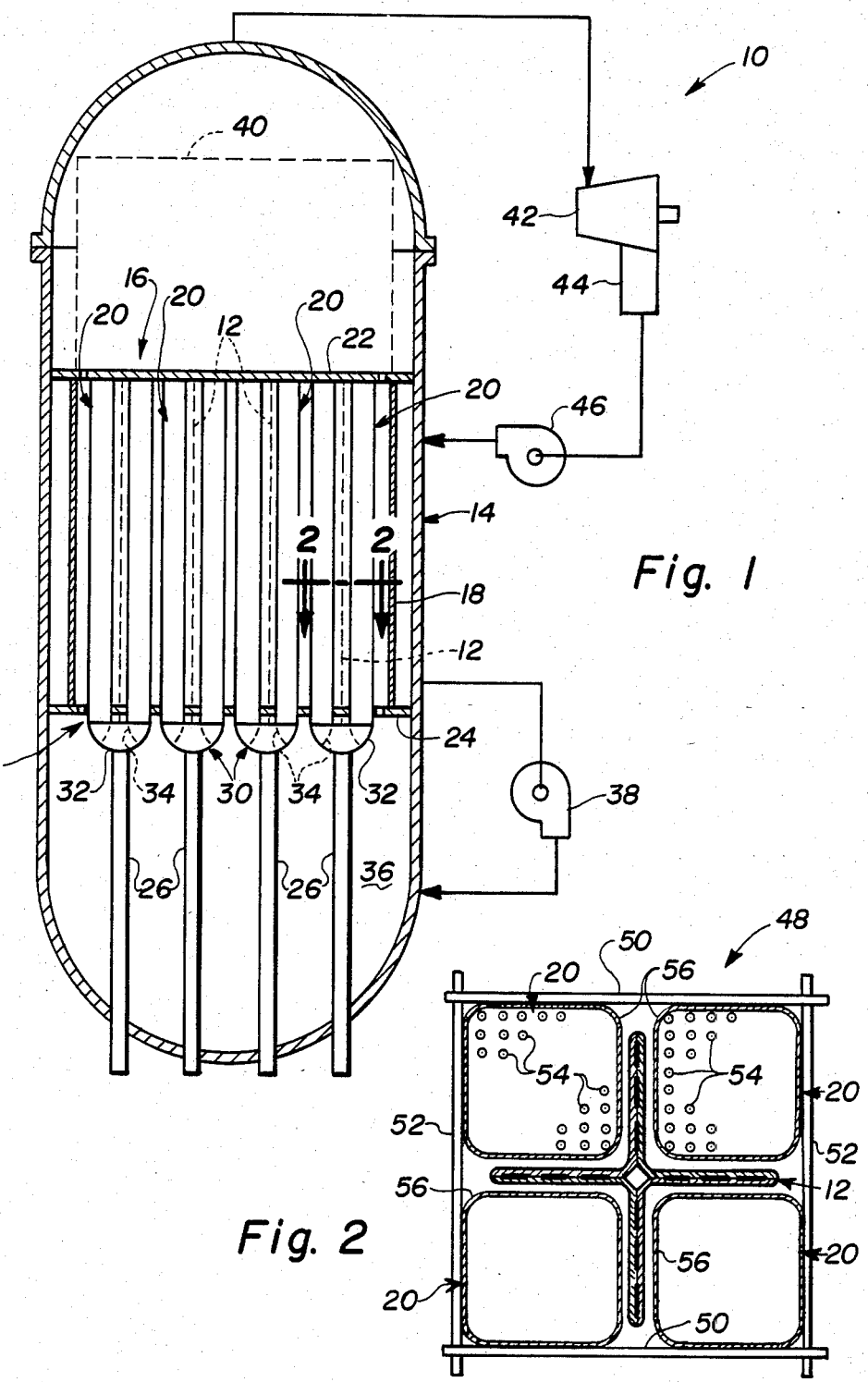
FIG. 1 is a schematic illustration of a boiling water nuclear power reactor (BWR) incorporating the improved control rod construction of the present invention.

Referring now to the drawings, and particularly to FIG. 1, there is shown in simplified schematic form a boiling water nuclear power reactor (BWR), generally designated 10, in which a plurality of the improved control rods 12 of the present invention are employed. In its conventional form, the BWR 10 includes a pressure vessel 14 containing a nuclear reactor core 16 submerged in a coolant-moderator, such as light water. The core 16, which is surrounded by an annular shroud 18, includes a plurality of replaceable fuel assemblies 20 arranged in spaced relation between an upper core grid 22 and a lower core plate 24.

Below the core 16, a plurality of drive housing tubes 26 are disposed in alignment with the fuel assemblies 20. The housing tubes 26 contain control rod drive mechanisms 28 (FIG. 3) by operation of which the plurality of improved control rods 12 are selectively insertable among the fuel assemblies 20 from below the core 16 for controlling the reactivity of the core. Each of the housing tubes 26 is fitted with a fuel assembly support member 30. Each of the support members 30 is formed with sockets 32 for receiving nose pieces 34 of four adjacent fuel assemblies 20. The support members 30 and sockets 32 are formed with coolant passages or openings for communication with a coolant supply chamber 36 defined in the pressure vessel 10 below the core 16.

A coolant circulation pump 38 pressurizes the coolant in the supply chamber 36 from which the coolant is thus forced upwardly through openings in the support members 30 and sockets 32. The coolant is then forced through openings in the nose pieces 34 of the fuel assemblies 20 and therefrom upwardly through the fuel assemblies. A part of the coolant returns to the coolant circulation pump 38 and another part is converted to steam which passes through a separator-dryer arrangement 40, shown in dashed outline form, to a utilization device, such as a turbine 42. Condensate formed in a condenser 44 associated with the turbine 42 is returned as feedwater to the pressure vessel 10 by a pump 46.

Figure 2:
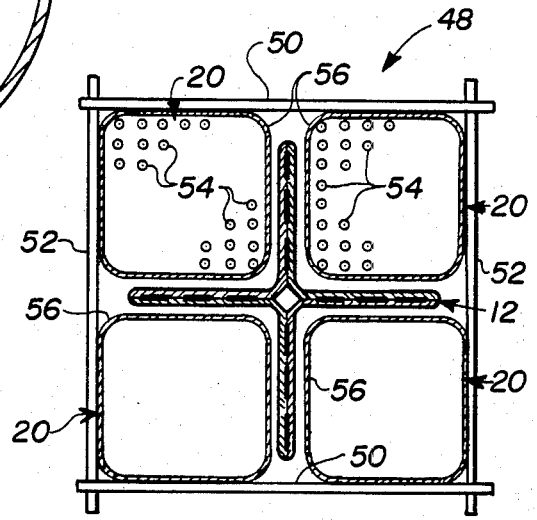
FIG. 2 is an enlarged schematic plan view of a fuel cell of the core of the BWR, illustrating a cross-section of the improved control rod taken along line 2—2 of FIG. 1.

Each of the improved control rods 12 and the cluster of four fuel assemblies 20 surrounding the control rod comprises a fuel cell 48 of the reactor core 16. One of such cells 48 is shown in FIG. 2 wherein the four fuel assemblies 20 surrounding one improved control rod 12 are laterally supported at their upper ends in the upper core support grid 22 formed in part by pairs of intersecting and interlocking beams 50 and 52. In a known arrangement, each of the replaceable fuel assemblies 20 is formed of a plurality of elongated fuel rods 54 supported in spaced side-by-side relationship between upper and lower tie plates (not shown). The fuel rods 54 of each fuel assembly 20 is surrounded by a tubular flow channel 56 which directs the coolant upwardly among the fuel rods.

Except for the improved control rods to be described hereinafter in detail, the above described basic components of the BWR 10 are known in the prior art, being disclosed in previously mentioned U.S. Pat. No. 4,285,769 and in earlier patents cited therein.

Improved BWR Control Rods

Figure 3:
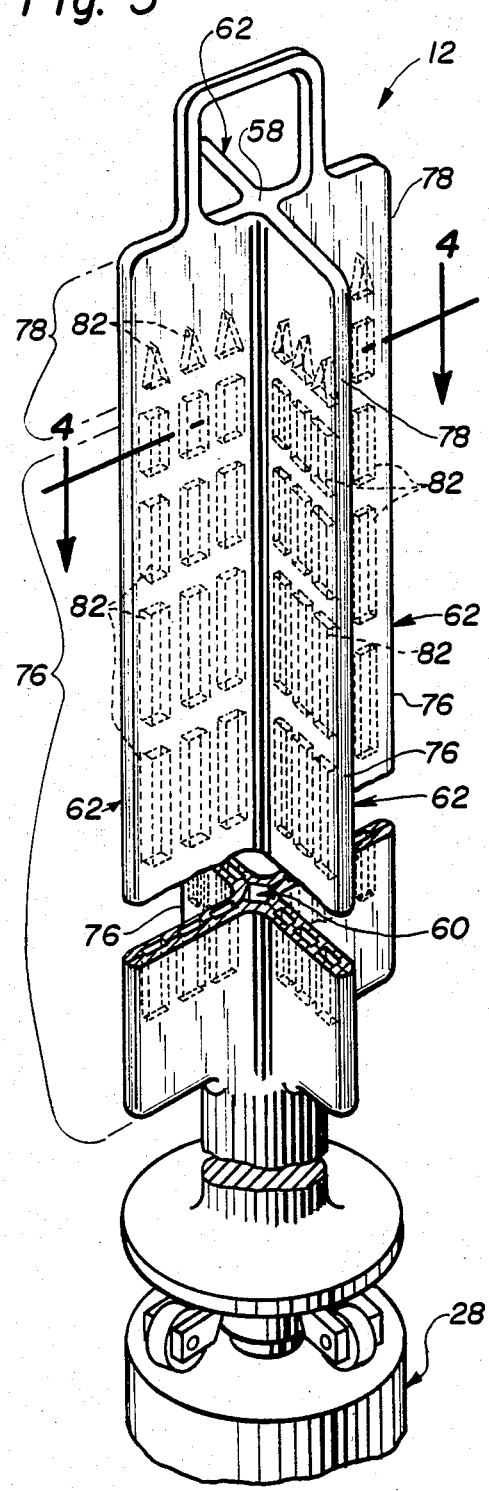
FIG. 3 is an enlarged fragmentary perspective view of the improved control rod and the drive mechaniam for moving it into and from the fuel cell.
Figure 4:
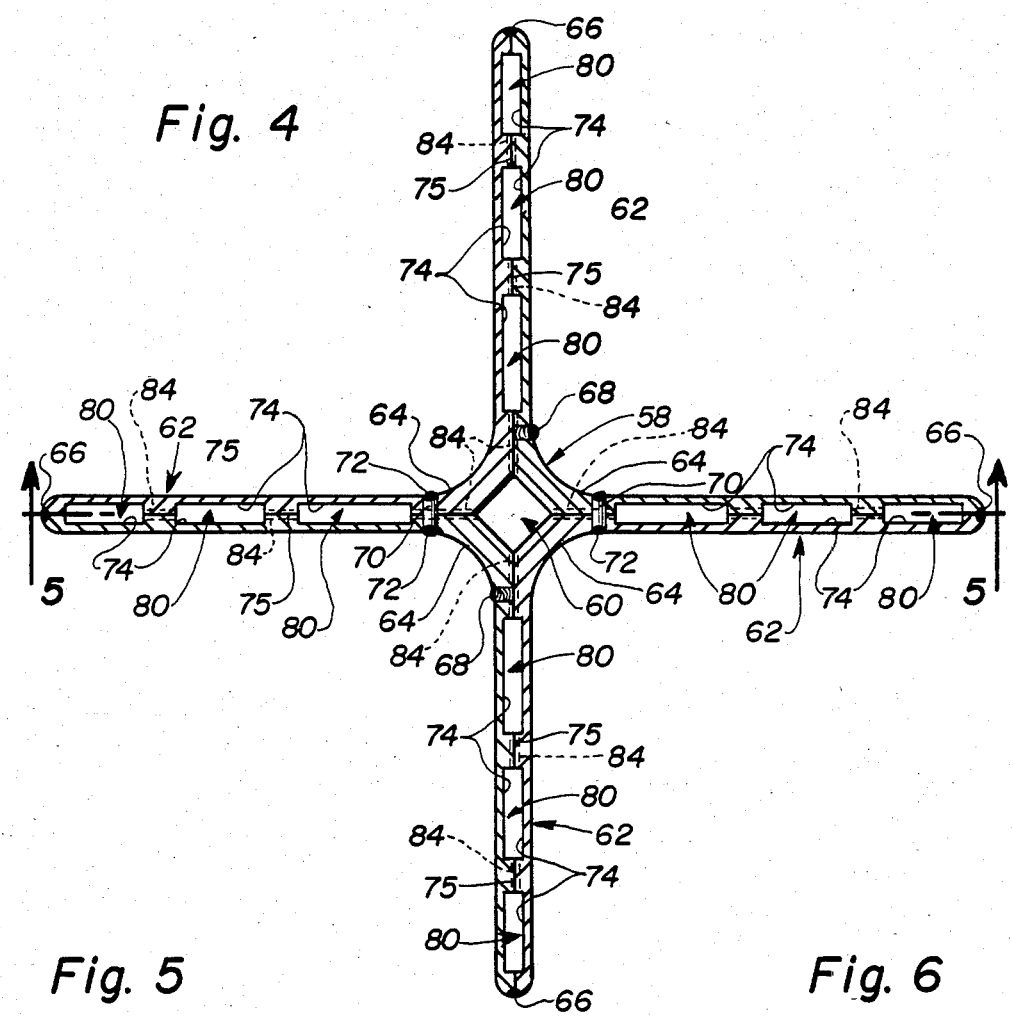
FIG. 4 is an enlarged sectional view of the improved control rod taken along line 4—4 of FIG. 3.

Turning now to FIGS. 3 and 4, as well as referring to FIG. 2, the portions of the improved control rod 12 which differ from the parts of the prior art control rod disclosed in the aforesaid patent will now be described. The improved control rod 12 includes an elongated stem 58 which defines a longitudinally extending internal central gas plenum 60 within the control rod and a plurality of blades 62, preferably four in number, connected to and extending radially outward from the stem. One opposite pair of the blades 62 are aligned in a first common plane, while the other opposite pair of the blades 62 are aligned in a second common plane which extends in orthogonal relationship to the first common plane. In such manner, the blades 62 give the control rod 12 its cruciform cross-sectional shape.

In one exemplary embodiment, the blades 62 and stem 58 are made up of four stainless steel plates 64 each in the form of a right angle and connected to one another by perimeter welds 66, plugs welds 68 and pins 70 with ends welds 72. The plates 64 have a series of recesses 74 formed in the mating surfaces 75 thereof. The purpose for the recesses will become apparent shortly.

Each blade 62 may be characterized as having an elongated body portion 76 extending along the stem 58 and terminating in an end tip portion 78. The end tip portions 78 lead insertion of the blade body portions 76 within the space between adjacent ones of the fuel assemblies 20 of FIG. 2 when the improved control rod 12 is moved into the fuel assembly cluster of the fuel cell 48.

The recesses 74 in mating surfaces 75 of the plates 64 forming each of the blades 62 define a series of internal cavities 80 arranged in columns and rows across the length and width of the blades 62. Neutron absorbing material in the form of a plurality of pellets 82 are disposed within each of the cavities 80. Each of the pellets 82 is undersized in relation to the size of its respective cavity 80 so as to allow extra space for swelling of the pellet as its temperature increases during movement of the control rod into the fuel cell 48. Also, each of the cavities 80 is connected by a internal groove 84 within each blade 62 for communication with the central plenum 60 within the stem 58. Thus, as the pellets 82, composed for example of boron carbide, absorb neutrons and generate helium gas, the gas can expand into the gas plenum 60.

Some of the pellets 82 in each blade 62 are arranged to form or define a longer, constant worth section which is generally coextensive with the body portion 76 of the blade. Pellets 82 in the constant worth section have a generally uniform level of neutron absorbing capacity and thus maintain a generally uniform level of reactive power in adjacent fuel rods 54 in the fuel assemblies 20 as the body portions 76 of the blades 62 move past the fuel rods during insertion of the control rod 12 into the cluster of fuel assemblies 20. Further, other of the pellets 82 in each plate 62 are arranged to form or define a shorter, reduced worth section which is generally coextensive with the end tip portion 78 of the blade. Pellets 82 in the reduced worth section have a gradually decreasing level of neutron absorbing capacity in parts nearer the top end 86 of the blade 62 and thus produce a gradual change or gradient in the reactive power in each fuel rod 54 near the tip portions 78 of the control rod blades 62 as the end tip portions of the blades move past the fuel rods during insertion of the control rod 12 into the cluster of fuel assemblies 20.

FIGS. 5 through 9 illustrate various alternative arrays and configurations of neutron absorbing pellets 82 for providing a reduced worth section as described above.

Figure 7:
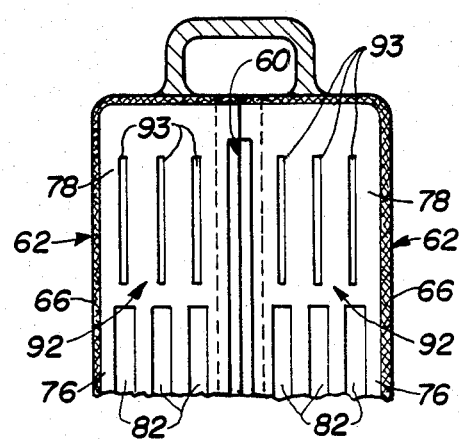
FIGS. 6 through 9 are sectional views similar to FIG. 5, but illustrating alternative embodiments of the reduced worth section of the improved control rod.
Figure 8:
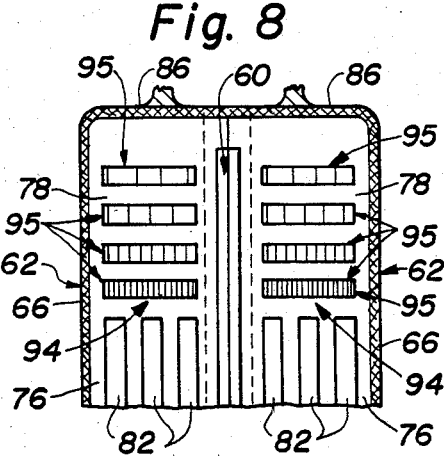
Figure 9:
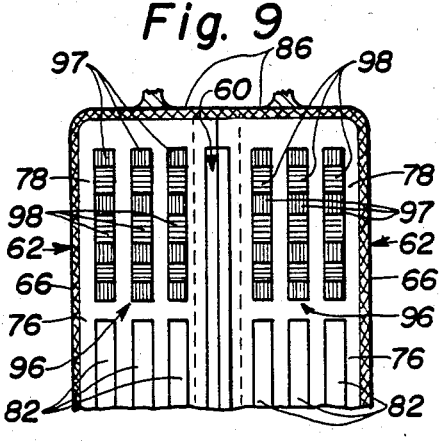
Figure 5:
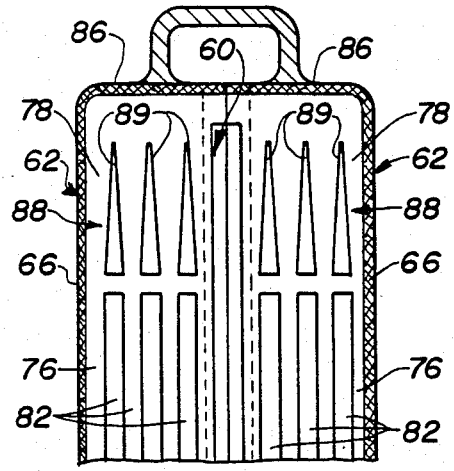
FIG. 5 is a sectional view, on a reduced scale, of the reduced worth section of the control rod, as taken along line 5—5 of FIG. 4.
Figure 6:
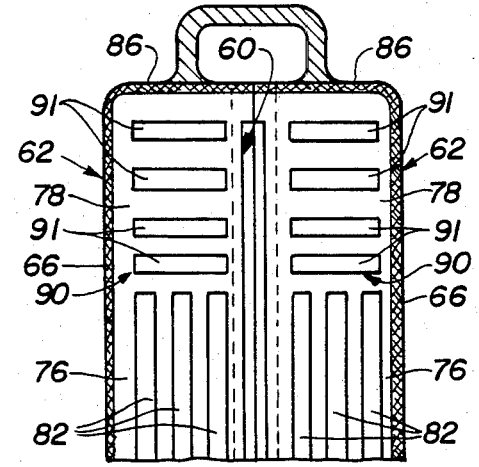

In FIG. 5, the reduced worth section in the end tip portion 78 of the blades 62 is composed of an array, generally designated 88, of pellets 89 in which each has a triangular shape and is aligned pointing toward the top end 86 of the blade. As the cross-section of each triangular pellet 82 diminishes in size going toward the top end 86 of the blade 62 so does the neutron absorbing capacity of the pellets. FIG. 6 illustrates another array 90 of pellets 91 having substantially the same volume, but spaced further apart as the top end 86 of the blade 62 is approached. Thus, the desired gradient is formed by the spacing between the pellets and not by the shape of one pellet compared to another. FIG. 7 depicts a stepwise reduction in the neutron absorbing capacity of the pellets 93 in yet another array 92 in which the pellets have a smaller width in the reduced worth section at the end tip portion 78 of the blade 62 than in the constant worth section at its body portion 76. FIG. 8 shows a further array 94 of pellets 95 in which the rows of pellets have a uniform vertical spacing, but the transverse gradient of the row nearest the top end 86 of the blade 62 has much less neutron absorbing capacity than the row nearest the constant worth section in body portion 76 of the blade 62. Finally, FIG. 9 illustrates a reduced worth section of the tip portion 78 of the blade 62 in which an array 96 of pellets 97 having neutron absorbing capacity are alternated with inert pellets 98 in uniform transversely spaced columns of pellets 97,98. A gradient is produced by the inert pellets 98 increasing in length as they near the top end 86 of the blade 62.

To be effective the reduced worth section in the end tip portion 78 of the blade 62 should be at least equal to or slightly greater than the incremental step of movement of the control rod 12, which conventionally is about six inches. This will allow the control rod 12 to be moved one step after which the pellets and clad are allowed to come to equilibrium before making the next step movement. Since BWR control rod movements are planned well in advance, this operating method can be implemented into the normal control system.

It is thought that the present invention and many of its attendant advantages will be understood from the foregoing description and it will be apparent that various changes may be made in the form, construction and arrangement of the parts of the improved control rod described without departing from the spirit and scope of the invention or sacrificing all of its material advantages, the form hereinbefore described being merely a preferred or exemplary embodiment thereof.

We claim:

1. In a control rod for a boiling water type nuclear power reactor, the improvement comprising:
   (a) an elongated central stem defining a longitudinally extending internal central gas plenum;
   (b) a plurality of blades connected to and extending along and radially outward from said stem, each said blade including an elongated body portion extending along said stem and terminating in an end tip portion;

(c) means defining a series of internal cavities in each of said blades, said cavities being arranged in columns and rows across the length and width of said body and tip portions of said blade;

(d) a plurality of pellets of neutron absorbing material, each disposed within one of said cavities with each of said cavities being oversized in relation to the size of said pellet disposed therein to allow extra space for swelling of said pellet, said cavities and said pellets disposed therein being arranged to define a longer, constant worth section generally coextensive with said body portion of said blade and a shorter, reduced worth section generally coextensive with said end tip portion of said blade; and (e) means defined within each blade communicating each of said cavities with said central gas plenum for allowing any gases generated by irradiation of said pellets to expand from said cavities into said plenum.

2. The improved control rod as recited in claim 1, wherein said cavities and said pellets therein defining said reduced worth section in said end tip portion of said blade comprise an array of triangular-shaped cavities and pellets which pellets diminish in neutron absorbing capacity in accordance with their decrease in cross-section from tip to base thereof.

3. The improved control rod as recited in claim 1, wherein said cavities and said pellets therein defining said reduced worth section in said end tip portion of said blade comprise an array of substantially identical cavities and pellets arranged in a column, said cavities and pellets in said column located more remote from said body portion of said blade being spaced farther apart that said cavities and pellets located near to said body portion.

4. The improved control rod as recited in claim 1, wherein said cavities and said pellets therein defining said reduced worth section in said end tip portion of said blade comprise an array of cavities and pellets having narrower widths than said cavities and pellets located in said body portion of said blade.

5. The improved control rod as recited in claim 1, wherein said cavities and said pellets therein defining said reduced worth section in said end tip portion of said blade comprise an array of cavities and pellets disposed in side-by-side columns, some of said pellets in said array being composed of neutron absorbing material and other of said pellets in said array being composed of inert material.

6. The improved control rod as recited in claim 5, wherein said inert and neutron absorbing pellets are disposed in an alternating arrangement in each said column of pellets.

7. In a nuclear power reactor including at least one cluster of fuel assemblies, each fuel assembly being spaced apart and containing a plurality of elongated fuel rods disposed in side by side relationship, an improved control rod associated with said cluster of fuel assemblies and in a predetermined alignment therewith, and a drive mechanism operable to move said improved control rod into and from said cluster of fuel assemblies for controlling the reactive power of said fuel rods therein, said improved control rod comprising:

(a) an elongated central stem defining a longitudinally extending internal central gas plenum;

(b) a plurality of blades connected to and extending along and radially outward from said stem, each blade including an elongated body portion extending along said stem and terminating in an end tip portion which leads insertion of said blade body portion within said space between adjacent ones of said fuel assemblies when said control rod is moved into said fuel assembly cluster, each blade incorporating a series of internal cavities arranged in columns and rows across the length and width of said body and end tip portions of said blade;

(c) a plurality of pellets composed of neutron absorbing material, each pellet disposed within one of said cavities and being undersized in relation to the size of its cavity so as to provide extra space for swelling of said pellet, said cavities and said pellets therein in each of said blades being arranged to define a longer, constant worth section generally coextensive with said body portion of said blade which maintains a generally uniform level of reactive power at adjacent fuel rods in said fuel assemblies as said body portions of said blades move past said fuel rods and a shorter, reduced worth section generally coextensive with said end tip portion of said blade which produces a gradual change in the level of reactive power at adjacent fuel rods in said fuel assemblies as said end tip portions of said blades move past said fuel rods, said cavities and said pellets therein in said reduced worth section at said end tip portion of said each blade being disposed in a predetermined array in which said cavities and pellets vary in at least one of configuration, dimension and spacing for producing a desired gradient; and (d) means defining a plurality of internal grooves within each blade communicating each of said cavities with said central gas plenum for allowing any gases generated by irradiation of said pellets to expand from said cavities into said plenum.

* * * * *